(12) United States Patent
Attaluri et al.

(10) Patent No.: US 10,489,401 B2
(45) Date of Patent: Nov. 26, 2019

(54) EFFICIENT AGGREGATION IN A PARALLEL SYSTEM

(71) Applicant: International Business Machines Corporation, Armonk, NY (US)

(72) Inventors: Gopi K. Attaluri, San Jose, CA (US); Ronald J. Barber, San Jose, CA (US); Vincent Kulandaisamy, Portland, OR (US); Vijayshankar Raman, Sunnyvale, CA (US); Liping Zhang, Portland, OR (US)

(73) Assignee: International Business Machines Corporation, Armonk, NY (US)

( * ) Notice: Subject to any disclaimer, the term of this patent is extended or adjusted under 35 U.S.C. 154(b) by 413 days.

(21) Appl. No.: 15/168,409

(22) Filed: May 31, 2016

(65) Prior Publication Data
US 2017/0344621 A1 Nov. 30, 2017

(51) Int. Cl.
*G06F 16/24* (2019.01)
*G06F 16/2453* (2019.01)
*G06F 16/2455* (2019.01)

(52) U.S. Cl.
CPC .. *G06F 16/24532* (2019.01); *G06F 16/24554* (2019.01)

(58) Field of Classification Search
None
See application file for complete search history.

(56) References Cited

U.S. PATENT DOCUMENTS

| 8,832,157 | B1* | 9/2014 | Shatdal | G06F 17/30469 |
| | | | | 707/802 |
| 8,924,429 | B1* | 12/2014 | Fisher | G06F 7/24 |
| | | | | 707/695 |
| 9,195,599 | B2 | 11/2015 | Barber et al. | |
| 9,195,732 | B2* | 11/2015 | Anderson | G06F 17/30598 |
| 2005/0066056 | A1 | 3/2005 | Dominic | |
| 2008/0168135 | A1 | 7/2008 | Redlich et al. | |

(Continued)

FOREIGN PATENT DOCUMENTS

| WO | 2009005594 A3 | 6/2009 |
| WO | 2014031481 A1 | 2/2014 |
| WO | 2014149955 A1 | 9/2014 |

OTHER PUBLICATIONS

List of IBM Patents or Patent Applications Treated as Related, Dec. 2017, 1 Page.

(Continued)

*Primary Examiner* — Uyen T Le
(74) *Attorney, Agent, or Firm* — Robert Bunker; Edell, Shapiro & Finnan, LLC (57) ABSTRACT

A method, a system, and a computer program product are provided. A filter is created for each portion of a data set. The filter indicates which one or more characteristics are present among each of the portions. Each of the one or more characteristics comprises one or more groups defined by the data grouping operation. The filters for the portions of the data sets are transferred to one or more filter processors and combined within the one or more filter processors to indicate characteristics of data residing across multiple processing elements to produce a result for a data grouping operation, utilizing transfers based on a combined filter result. In various embodiments, the filter may be a Bloom filter.

12 Claims, 3 Drawing Sheets

(56) References Cited

U.S. PATENT DOCUMENTS

| | | | |
|---|---|---|---|
| 2010/0088315 A1* | 4/2010 | Netz | G06F 17/30501 |
| | | | 707/737 |
| 2012/0023200 A1 | 1/2012 | Johnson et al. | |
| 2012/0046017 A1 | 2/2012 | Jennings | |
| 2013/0151631 A1 | 6/2013 | Jensen et al. | |
| 2016/0034587 A1* | 2/2016 | Barber | G06F 16/24532 |
| | | | 707/754 |
| 2018/0107732 A1 | 4/2018 | Attaluri et al. | |

OTHER PUBLICATIONS

Goldstein et al., "Using aggregation and dynamic queries for exploring large data sets." Proceedings of the SIGCHI Conference Human Factors Computing Systems. ACM, 1994, pp. 23-29.

Su et al; "Supporting user-defined subsetting and aggregation over parallel NetCDF datasets." Cluster, Cloud and Grid Computing (CCGrid), 2012 12th IEEE/ACM, 2012, pp. 212-219.

Chen et al., "Tiled-MapReduce: Optimizing Resource Usages of Data-parallel Applications on Multicore with Tiling", PACT '10, Sep. 2010, pp. 523-534.

SAP, "SAP Hana Database for Next-Generation Business Applications and Real-Time Analytics", 2016, http://www.dynpro.com/wp-content/uploads/2016/03/SAP-HANA-Next-Generation-Business-Applications-and-Real-Time-Analytics.pdf.

Tian et al., "Joins for Hybrid Warehouses: Exploiting Massive Parallelism in Hadoop and Enterprise Data Warehouses", Published in Proc. 18th International Conference on Extending Database Technology (EDBT), Mar. 3-27, 2015, Brussels Belgium: ISBN 978-3-89318-067-7, on OpenProceedings.org, 2015, pp. 373-384.

* cited by examiner

EFFICIENT AGGREGATION IN A PARALLEL SYSTEM

BACKGROUND

Present invention embodiments are related to a method, at least one processing device, and a computer program product for identifying rows to be processed for a relational database query, in a parallel system, wherein the rows have a unique grouping key within a parallel element such that partial aggregation of the rows having the unique grouping key can be avoided on the parallel element and groups that are identified as only existing within a single respective parallel element need not be communicated to other parallel elements for further aggregation. In particular, only those rows having duplicate grouping keys that exist on multiple parallel elements are communicated to other parallel elements for further aggregation.

Group-by in a parallel system involves coordination among parallel elements to combine local aggregates for a group into a final global aggregate. Various approaches may be employed to perform this operation.

In a first technique, all parallel elements access a single aggregation data structure, which may be a hash table or sort-based. Because there is only one copy, memory requirements are reduced. However, synchronization cost is high. Improvements to this method include synchronizing using atomics instead of mutexes, treating hot data differently from cold data, etc.

In a second technique, data may be partitioned, by range or via a hash, based on a group-by key. Each partition is distributed to a different parallel element for grouping and aggregation. A cost to partition the data is high, particularly when communicating the data among parallel elements is expensive.

In a third technique, the data is distributed in a round robin fashion to each parallel element such that each parallel element does a partial aggregation on a subset of the data. All partial results from each of the parallel elements are merged to generate final aggregation results. A cost for communicating and merging the results is high.

Using a fourth technique, a hierarchy of aggregators is provided. The aggregators are loosely aligned to a memory hierarchy. Tuples are aggregated in a highest level aggregator as far as possible, and only when the highest level aggregator runs out of memory, tuples are migrated to lower level aggregators. Among the high level aggregators, merge cost and memory consumption can be high.

SUMMARY

According to embodiments of the present invention, a computer-implemented method, a system, and a computer program product are provided. Embodiments may be implemented by at least one processing device. A respective filter may be created for each portion of a data set indicating which one or more characteristics are present among each of the portions. Each of the one or more characteristics comprises one or more groups defined by a data grouping operation. The respective filters for the portions of the data set may be transferred to one or more filter processors and combined to indicate characteristics of data residing across multiple processing elements. The data for characteristics that reside on the multiple processing elements are merged to produce a result for a data grouping operation, utilizing transfers based on a combined filter result.

BRIEF DESCRIPTION OF THE DRAWINGS

Generally, like reference numerals in the various figures are utilized to designate like components.

DETAILED DESCRIPTION

Figure 1:
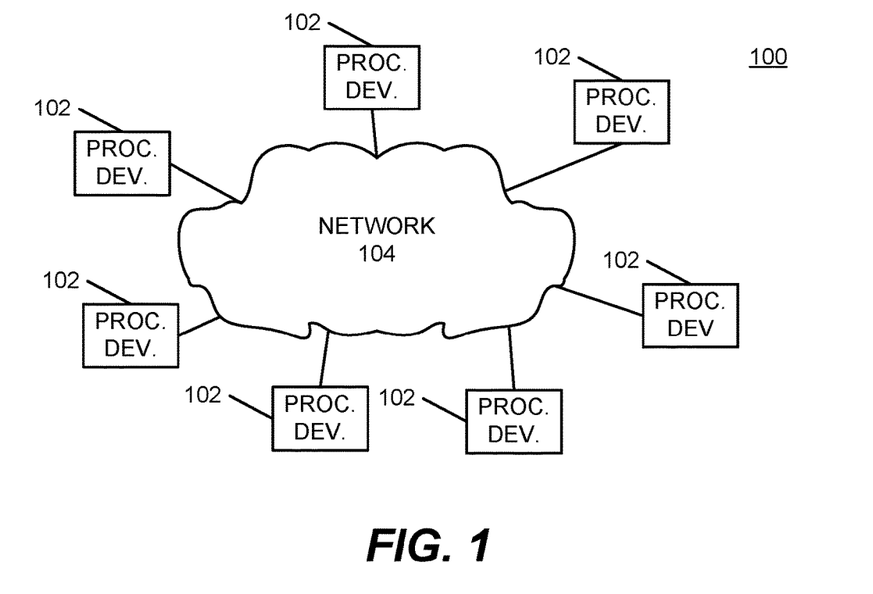
FIG. 1 illustrates an example environment in which embodiments of the invention may operate.

With reference now to FIG. 1, an example environment 100 for implementation of embodiments is shown. Example environment 100 may include multiple processing devices 102 in a parallel system for aggregating and performing database queries and a network 104 for permitting communications among processing devices 102. Network 104 may be implemented by any number of any suitable communications media (e.g., wide area network (WAN), local area network (LAN), Internet, Intranet, etc.). Although FIG. 1 shows seven processing devices 102, actual implementations may have fewer or more processing devices.

Figure 2:
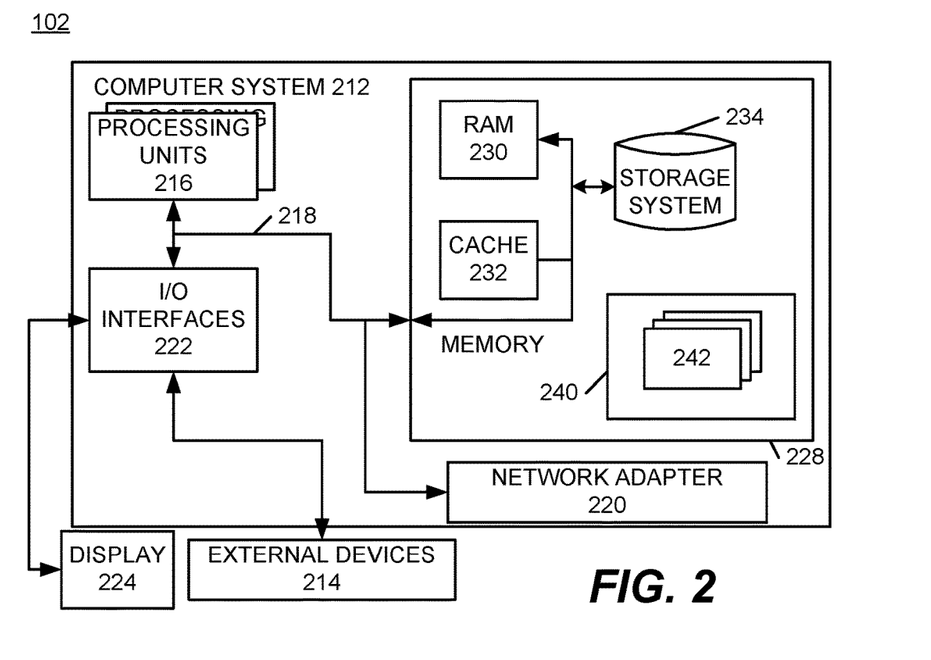
FIG. 2 shows an example processing device which may implement various embodiments of the invention.

FIG. 2 illustrates an example processing device 102, which may also be an example environment for implementations of various embodiments. Processing device 102 is only one example of a suitable processing device for the environment of FIG. 1 and is not intended to suggest any limitation as to the scope of use or functionality of embodiments of the invention described herein. Regardless, processing device 102 is capable of being implemented and/or performing any of the functionality set forth herein.

In processing device 102, there is a computer system 212 which is operational with numerous other general purpose or special purpose computing system environments or configurations. Examples of well-known computing systems, environments, and/or configurations that may be suitable for use with computer system 212 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 212 may be described in the general context of computer system executable instructions, such as program modules, being executed by a computer system. Generally, program modules may include routines, programs, objects, components, logic, data structures, and so on that perform particular tasks or implement particular abstract data types. Computer system 212 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 2, computer system 212 is shown in the form of a general-purpose computing device. Components of computer system 212 may include, but are not limited to, one or more processors or processing units 216 (for the example environment 100) and two or more processors or processing units 216 for a second example environment, a system memory 228, and a bus 218 that couples various system components including system memory 228 to one or more processors 216.

Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 212 typically includes a variety of computer system readable media. Such media may be any available media that is accessible by computer system 212, and includes both volatile and non-volatile media, and removable and non-removable media.

System memory 228 can include computer system readable media in the form of volatile memory, such as random access memory (RAM) 230 and/or cache memory 232. Computer system 212 may further include other removable/non-removable, volatile/non-volatile computer system storage media. By way of example only, storage system 234 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 218 by one or more data media interfaces. As will be further depicted and described below, memory 228 may include at least one program product having a set (e.g., at least one) of program modules that are configured to carry out the functions of embodiments of the invention.

Program/utility 240, having a set (at least one) of program modules 242, may be stored in memory 228 by way of example, and not limitation, as well as an operating system, one or more application programs, other program modules, and program data. Each of the operating system, the one or more application programs, the other program modules, and program data or some combination thereof, may include an implementation of a networking environment. Program modules 242 generally carry out the functions and/or methodologies of embodiments of the invention as described herein.

Computer system 212 may also communicate with one or more external devices 214 such as a keyboard, a pointing device, a display 224, etc.; one or more devices that enable a user to interact with computer system 212; and/or any devices (e.g., network card, modem, etc.) that enable computer system 212 to communicate with one or more other computing devices. Such communication can occur via Input/Output (I/O) interfaces 222. Still yet, computer system 212 can communicate with one or more networks such as a local area network (LAN), a general wide area network (WAN), and/or a public network (e.g., the Internet) via network adapter 220. As depicted, network adapter 220 communicates with the other components of computer system 212 via bus 218. It should be understood that, although not shown, other hardware and/or software components could be used in conjunction with computer system 212. Examples, include, but are not limited to: microcode, device drivers, redundant processing units, external disk drive arrays, RAID systems, tape drives, and data archival storage systems, etc.

Embodiments of the invention may be implemented using parallel elements, wherein the parallel elements may include threads on a multicore processing device, virtual machines, a physical processing node, a logical processing node, a collection of physical processing nodes, or a collection of logical processing nodes.

Figure 3:
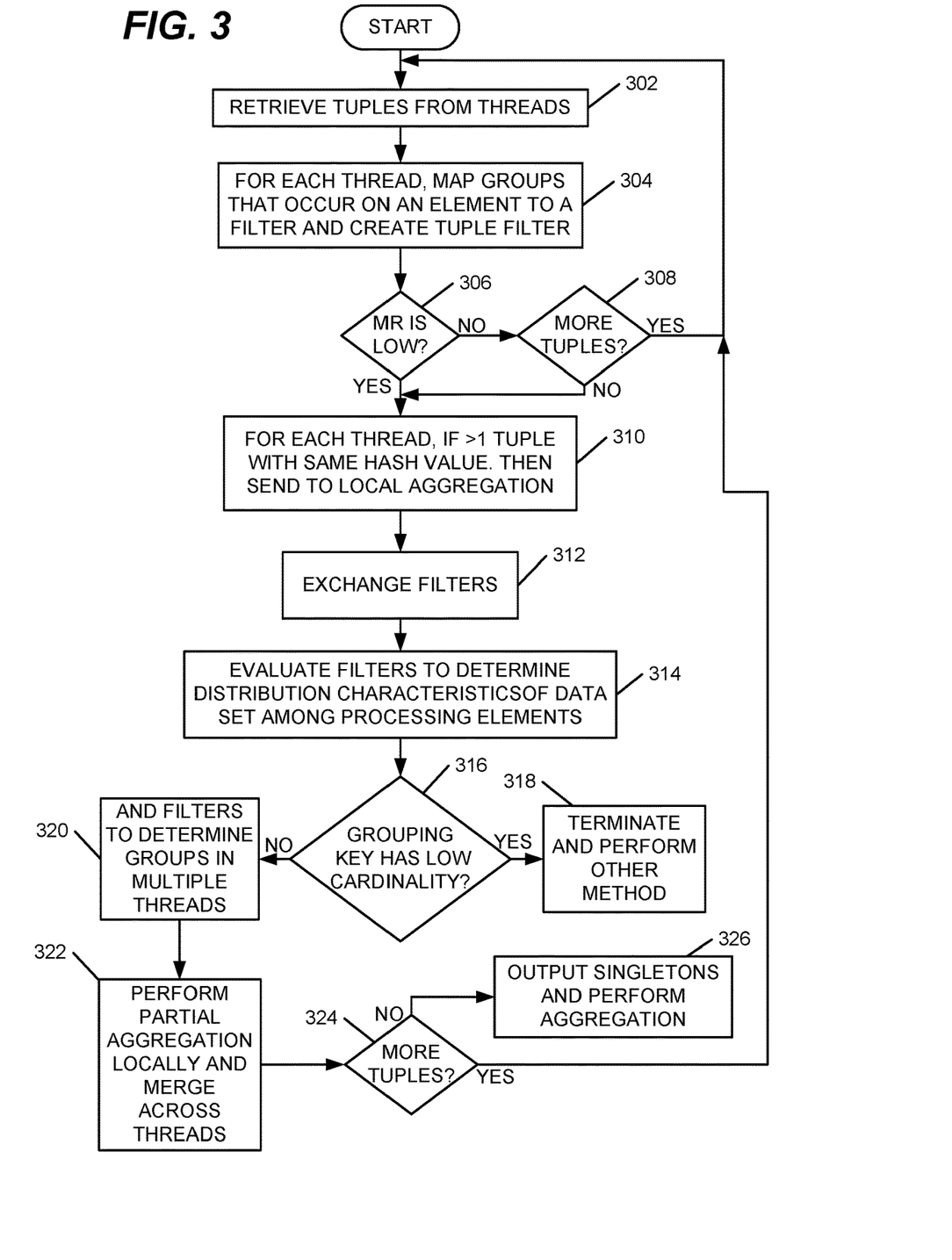
FIG. 3 is a flowchart that explains example processing in some embodiments of the invention.

FIG. 3 is a flowchart that illustrates example processing in embodiments of the invention. The processing is explained below with reference to an example. The example is a 2-parallel-element case with a table T, which has a definition of (G integer, A integer, B integer) and has 9 rows: (10, 13, 1), (1, 3, 2), (10, 2, 2), (1, 4, 20), (3, 1, 4), (1, 3, 3), (5, 6, 1), (1, 4, 4), (3, 5, 1). The query to be processed is "select G, count (distinct A), sum (B) from T group by G".

In a first stage, input may be taken in as batches. Thus, the process may begin with parallel elements retrieving a first batch of tuples from corresponding threads (act 302). For each thread of a parallel element, groups that occur on each element are mapped to a filter and a tuple filter may be created (act 304). The filter may be a Bloom filter, which, in one implementation, uses two bits for each group. A first bit of the filter may be an existence bit which identifies whether a group value hashes to this particular position. A second bit of the filter may be a singleton bit which identifies whether more than one tuple with a same hash value exists in the thread. In other implementations, the Bloom filter may be implemented in other forms including, but not limited to, a 2-bit counting filter.

Walking through the process, assuming that 10 hashes to 2, 1 hashes to 4, and 3 hashes to 6. For (10, 13, 1), we see that a Bloom filter having a size of 8 becomes:
00 00 10 00 00 00 00 00
After Processing (1, 3, 2), the Bloom Filter Becomes:
00 00 10 00 10 00 00 00
Next, after processing (10, 2, 2), the Bloom filter becomes:
00 00 11 00 10 00 00 00
After processing (1, 4, 20), the Bloom filter becomes:
00 00 11 00 11 00 00 00
After processing (3, 1, 4), the Bloom filter becomes:
00 00 11 00 11 00 10 00
A corresponding tuple filter, showing mappings of tuples to hash values, may be created and equals {2, 4, 2, 4, 6}. The tuple filter may be used to either aggregate tuples in a hash table, if needed, or output tuples for the final result set.

In other embodiments, instead of creating an explicit tuple-filter map, a first tuple that hashes to a particular position may be treated as a singleton and placed in a buffer of potential singletons. The second and subsequent tuples that hash onto the particular position in the hash table may be sent for aggregation.

Walking through a second thread in the second parallel element, using a same hash as the first thread and assuming that 5 hashes to 7, after processing (1, 3, 3) a second Bloom filter of size 8 becomes:
00 00 00 00 10 00 00 00
After processing (5, 6, 1), the second Bloom filter becomes:
00 00 00 00 10 00 00 10
After processing (1, 4, 4), the second Bloom filter becomes:
00 00 00 00 11 00 00 10
After processing (3, 5, 1), the second Bloom filter becomes:
00 00 00 00 11 00 10 10

A corresponding second tuple filter, showing mappings of tuples to hash values, may be created and equals {4, 7, 4, 6}.

Next, the process may determine whether available memory remaining is low. In one embodiment, the process may determine whether the available memory remaining is less than 25% of total memory, or another suitable value (act 306). An early merge may be performed to reduce memory requirements if memory resources are low. If available memory remaining is not low, then a determination is made regarding whether there are more tuples to retrieve (act 308). If there are more tuples to retrieve, then acts 302 through 306 may be repeated. Otherwise, if there are no additional tuples to retrieve or available memory is low, then for each thread, if there are more than one tuple with a same hash value, then those tuples may be sent to local aggregation to be aggregated (act 310).

With respect to the first Bloom filter, the "11" at the second and fourth positions indicate that multiple tuples have a same grouping key. These tuples are to be aggregated locally and saved in the hash table. The value "10" at the sixth position in the filter indicates that a corresponding group or tuple occurs only once. Therefore, no partial aggregation is needed for that tuple. That tuple will stay in an input stream and will be copied out only when the final result is needed.

Instead of exchanging actual data, the parallel elements exchange filters (act 312). This is more efficient than exchanging the groups of data themselves. At this point, the distribution characteristics of a data set, as indicated by the filters, may be determined (act 314). If cardinality of the grouping key is low, then the majority of groups are either tuples with grouping keys that are not unique within an element or tuples with grouping keys that appear in multiple elements. When the cardinality of the grouping key is low, an efficiency benefit of the various embodiments may not be obtained. Therefore, if the cardinality of the grouping key is low (act 316), then the process may be terminated and another aggregation method may be performed, such as one of the four techniques mentioned above (act 318).

Otherwise, if the cardinality of the grouping key is not low, then the filters are ANDed among the parallel elements to determine groups, among the multiple threads, that are to be merged (act 320). Thus, each parallel element ANDs the filters to produce a combined filter as shown here:

00 00 11 00 11 00 10 00 First Filter
00 00 00 00 11 00 10 10 Second Filter
00 00 00 00 11 00 10 00 Combined Filter As long as the existence bit (the left bit of a bit pair in the filter) is set, the corresponding group is to be merged across threads. As shown by the combined filters and with use of the tuple filters, groups having a grouping key G of 1 are to be merged and groups having a grouping key G of 3 are to be merged.

At this point, local aggregations of multiple groups having a same grouping key may be performed and results saved in the hash table (act 322). Locally aggregating (10, 13, 1) and (10, 2, 2) from the first thread results in
G:10, count distinct A set (A:13, A:2), sum B:3=G:10, count distinct A:2, sum B:3
Locally aggregating (1, 3, 2) and (1, 4, 20) from the first thread results in
G:1, count distinct A set{A:3, A:4}, sum B:22=G:1, count distinct A:2, sum B:22

With respect to the second filter, the "11" at the fourth position indicates multiple tuples have a same grouping key. The value "10" in the sixth and seventh positions indicate that corresponding groups, or tuples, only occur once in the thread. Therefore, no partial aggregation is needed for these corresponding groups or tuples, which stay in the input stream and will be copied out only when the final result is needed. The grouping key 1 corresponds to the "11" in the second filter. Local aggregation of (1, 3, 3) and (1, 4, 4) from the second thread results in G:1, count distinct A set (A:3, A:4), sum B:7=G:1, count distinct A:2, sum B:7

Using the combined filter, both threads may determine that two groups are to be merged beyond the threads. This could be done in a shared hash table or one thread could publish its hash table and those tuples still in the input stream, so the other thread can access the tuples and perform the merge (act 322). To aggregate the two groups (with grouping keys 1 and 3, as indicated by the combined filter and the tuple filters), the partially aggregated groups with grouping key 1 from the first thread will be merged with the partially aggregated groups with grouping key 1 from the second thread. The partial aggregation for grouping key 1 of the first thread is
G:1, count distinct A set{A:3, A:4}, sum B:22=G:1, count distinct A:2, sum B:22 and the partial aggregation for group ID 1 of the second thread is
G:1, count distinct A set (A:3, A:4), sum B:7=G.1, count distinct A:2, sum B:7
Merging the two partial aggregations results in
G:1, count distinct A set {A:3, A:4}, sum B:29=G:1, count distinct A:2, sum B:29
Merging the single occurrence of group ID 3 of the first thread, (3, 1, 4) with the single occurrence of group ID 3 in the second thread, (3, 5, 1) results in
G:3, distinct A set{1, 5}, sum B:5=G:3, distinct A:2, sum B:5

A determination may then be made regarding whether there are additional tuples to retrieve (act 324). If more tuples are to be retrieved, then acts 302 through 306 may be performed again. Otherwise, singletons may be output and included in the final aggregation result (act 326). Thus (5, 6, 1) from the second thread is output and evaluated to G:5, distinct A:1, sum B:1.

The final output result is:
G:5, count distinct A:1, sum B:1
G:10, count distinct A:2, sum B:3
G:1, count distinct A:2, sum B:29
G:3, count distinct A:2, sum B:5

Although the above-mentioned example is a 2-threaded case and uses only an integer data type, embodiments of the invention work for multiple parallel elements in general and with any data types. The parallel element can be a thread, a virtual machine (VM), a physical processing node, a logical processing node, a collection of physical processing nodes, or a collection of logical processing nodes, etc. of a system.

Figure 4:
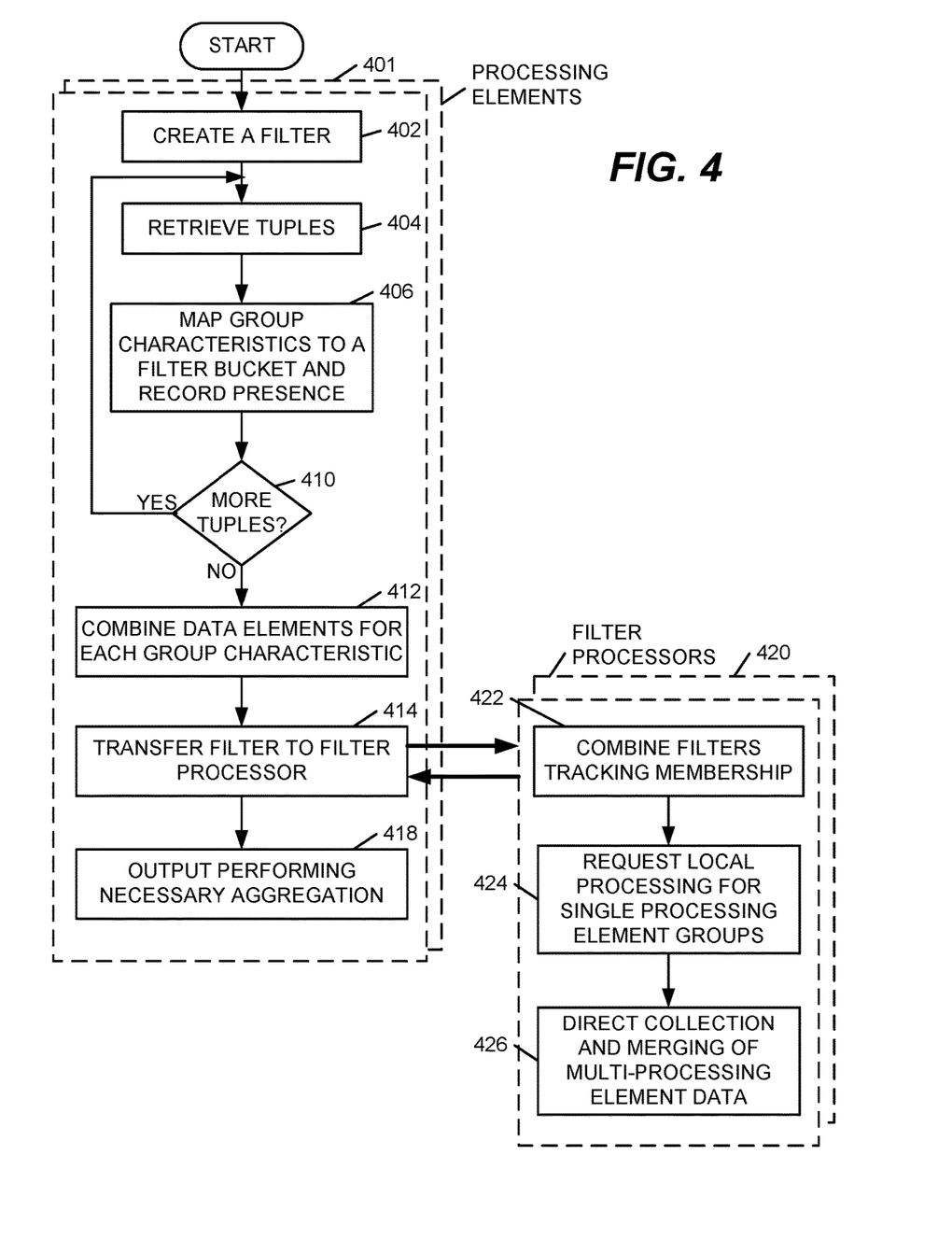
FIG. 4 is a flowchart that explains example basic filter processing in some embodiments of the invention.

FIG. 4 is a flowchart that illustrates example basic filter processing in various embodiments of the invention. The example depicts processing elements 401 and one or more filter processors 420 and interactions therebetween. Processing elements 401 may include processing devices 102 in some embodiments. In other embodiments, processing elements 401 may include an application specific integrated circuit (ASIC), a field programmable gate array (FPGA) or other hardware component, or combination thereof. Similarly, filter processors 420 may include processing devices 102, in some embodiments, and an ASIC, FPGA or other hardware component, or combination thereof, in other embodiments.

In an example embodiment, each processing element 401 may start by constructing a filter (act 402) used to track memberships of groups for a respective processing element 401. A number of elements in the filter need not match a number of distinct groups and may be smaller or larger than the number of distinct groups. Although a larger number of elements than the number of distinct groups adds no value, the elements of the filter can be as small as a single bit (0 or 1) within a computing engine. Thus, thousands of these elements may utilize only N/8 byes of memory where N is a number of filter buckets. Having no strong size requirement simplifies building of this filter. Often a number of distinct groups is not known until all data has been examined.

Tuples of data may be gathered, or retrieved, by each processing element 401 and may flow into a mapping process (act 406) that translates a grouping characteristic into a filter bucket and records a presence of the filter bucket (act 404), which may pertain to one or more such grouping characteristics. Once the grouping characteristic is translated, recording is performed, generally by setting a bit of a filter to indicate that an instance of the related characteristic is present (act 406).

A decision may be made based upon whether unprocessed tuples are available (act 410). If unprocessed tuples are available, then more tuples are gathered, or retrieved, as control returns to act 404. If no unprocessed tuples are available, then data elements may be combined for each group characteristic (act 412). Generally, this means that aggregation takes place for data elements consumed by a local processing element. The filter may be transferred to filter processors 420 which may be running on a same computing resources as processing elements 401, on a subset of the computing resources of the processing elements 401 or on resources distinct from processing elements 401 (act 414).

One or more filter processors 420 may combine the transferred filters thereby tracking membership (act 422), thus maintaining knowledge regarding which filter buckets have members from which processing elements. This knowledge allows one or more filter processors 420 to request local processing for groups associated with only a respective single processing element (act 424); thus avoiding transfer to filter processors 420 of data elements associated with only the respective single processing elements. The groups associated with remaining multiple processing elements have a coordinated collection and merging (act 426) which may be directed by one or more filter processors 420, or one or more filter processors 420 may request specific processing elements 401 to merge and process data elements for specific groups.

Results of the coordinated collection and merging may be output by either processing elements 401 (when processing elements 401 perform final processing) or, potentially, one or more filter processors 420 (when one or more filter processors 420 perform the final processing).

The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., browser software, communications software, server software, etc.). These systems may include any types of monitors and input devices (e.g., keyboard, mouse, voice recognition, etc.) to enter and/or view information.

It is to be understood that the software of the present invention embodiments may be implemented in any desired computer language and could be developed by one of ordinary skill in the computer arts based on the functional descriptions contained in the specification and flowcharts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and may communicate via any suitable communications medium (e.g., LAN, WAN, Intranet, Internet, hardwired, modem connection, wireless, etc.). For example, the functions of the present invention embodiments may be distributed in any manner among the various systems, and/or any other intermediary processing devices. The software and/or algorithms described above and illustrated in the flowcharts may be modified in any manner that accomplishes the functions described herein. In addition, the functions in the flowcharts or description may be performed in any order that accomplishes a desired operation.

The software of the present invention embodiments may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information. The database system may be implemented by any number of any conventional or other databases, data stores or storage structures (e.g., files, databases, data structures, data or other repositories, etc.) to store information. The database system may be included within or coupled to a server and/or client systems. The database systems and/or storage structures may be remote from or local to the computer or other processing systems, and may store any desired data.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

We claim as our invention:

1. A system for performing a data grouping operation on a data set via a plurality of processing elements, each of the plurality of processing elements processing a portion of the data set, the system comprising:
   at least one processor; and
   at least one memory connected with the at least one processor, wherein the at least one memory has instructions for the at least one processor to perform a method comprising:
      creating a respective filter for each portion of the data set indicating which one or more characteristics are present among each of the portions, each of the one or more characteristics comprises one or more data groups defined by the data grouping operation, for each of the one or more data groups one respective bit of the respective filter identifying whether a corresponding group value hashes to a value corresponding to a respective position of the one respective bit;
      performing a local data grouping operation on each of the processing elements;
      transferring the filters for the portions of the data set to one or more filter processors;
      combining the filters by a logical and operation within the one or more filter processors to indicate characteristics of data residing across multiple processing elements; and
      merging the data for characteristics that reside on the multiple processing elements to produce a result for the data grouping operation, utilizing transfers based on a combined filter result.

2. The system of claim 1, wherein the respective filter includes a Bloom filter.

3. The system of claim 1, wherein the merging the data further comprises:
   operating on data groups of the one or more data groups residing across the multiple processing elements based on the combined filters and local data groups; and
   combining aggregated data groups across the multiple processing elements, aggregated data groups of plural members on single ones of the processing elements, and data groups of single members on single ones of the processing elements to produce the result for the data grouping operation, wherein
   the created respective filters further indicate which of one or more common characteristics are present in only a single processing element.

4. The system of claim 3, wherein the combining the aggregated data groups across the multiple processing elements, aggregated data groups of plural members on single ones of the processing elements, and data groups of single members on single ones of the processing elements occur on the multiple processing elements as directed by the one or more filter processors.

5. The system of claim 1, wherein each of the plurality of processing elements includes one of a thread, a virtual machine, a physical processing node, a logical processing node, a collection of physical processing nodes, and a collection of logical processing nodes.

6. The system of claim 1, wherein the method further comprises:
   evaluating the created filters to determine distribution characteristics of the data set among the plurality of processing elements; and
   dynamically terminating use of the created filters for performing the data grouping operation based on the determined distribution characteristics.

7. A computer program product comprising:
   at least one computer readable storage medium having computer readable program code embodied therewith for execution on a processing system, the computer readable program code being configured to be executed by the processing system to:
   create a respective filter for each portion of the data set indicating which one or more characteristics are present among each of the portions, each of the one or more characteristics comprises one or more data groups defined by a data grouping operation, for each of the one or more data groups one respective bit of the respective filter identifying whether a corresponding group value hashes to a value corresponding to a respective position of the one respective bit;
   perform a local data grouping operation on each of the processing elements;
   transfer the filters for the portions of the data set to one or more filter processors;
   combine the filters by a logical and operation within the one or more filter processors to indicate characteristics of data residing across multiple processing elements; and
   merge the data for characteristics that reside on the multiple processing elements to produce a result for the data grouping operation, utilizing transfers based on a combined filter result.

8. The computer program product of claim 7, wherein the respective filter includes a Bloom filter.

9. The computer program product of claim 7, wherein the merging the data further comprises:

operating on data groups of the one or more data groups residing across the multiple processing elements based on the combined filters and local data groups; and combining aggregated data groups across the multiple processing elements, aggregated data groups of plural members on single ones of the processing elements, and data groups of single members on single ones of the processing elements to produce the result for the data grouping operation, wherein the created respective filters further indicate which of one or more common characteristics are present in only a single processing element.

10. The computer program product of claim 9, wherein the combining the aggregated data groups across the multiple processing elements, aggregated data groups of plural members on single ones of the processing elements, and data groups of single members on single ones of the processing elements occur on the multiple processing elements as directed by the one or more filter processors.

11. The computer program product of claim 7, wherein each of the plurality of processing elements includes one of a thread, a virtual machine, a physical processing node, a logical processing node, a collection of physical processing nodes, and a collection of logical processing nodes.

12. The computer program product of claim 7, wherein the computer readable program code is further configured to be executed by the processing system to:

evaluate the created filters to determine distribution characteristics of the data set among the plurality of processing elements; and dynamically terminate use of the created filters for performing the data grouping operation based on the determined distribution characteristics.

* * * * *